Patented Dec. 19, 1933

1,939,692

UNITED STATES PATENT OFFICE 1,939,692

ACCELERATOR FOR RUBBER VULCANIZATION

Albert F. Hardman, Cumberland, Md., assignor to Kelly-Springfield Tire Company, Cumberland, Md., a corporation of New Jersey No Drawing. Application May 4, 1928
Serial No. 275,252

12 Claims. (Cl. 260—54)

This invention pertains to the art of rubber vulcanization, and specifically embraces the production of new accelerator compounds, as well as certain methods of producing the same.

The most powerful accelerators described in the literature are in general salts or derivatives of the dithio-carbamic, xanthic and dithio-carboxylic acids, all of which may be represented by the type formula,

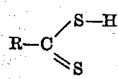

where "R" represents a substituted amine group, an oxy-alkyl or a hydrocarbon radical respectively. The salts of these three related substances have in general the property of causing vulcanization at very low temperatures, so much so that they cannot be used in compounds subject to the usual factory operations, and therefore have but a limited application.

I have found that when such dithio compounds are condensed with a halogen substituted organic acid, such as chloracetic acid, products are obtained having new and useful properties as accelerators of vulcanization.

The condensation is best carried out by bringing together solutions of salts of the two reacting substances, and may be represented, where chloracetic acid is employed by the general reaction formula,

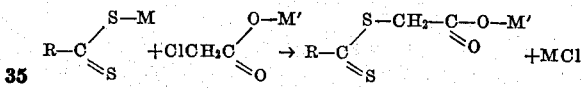

where "R" represents any of the radicals defined above and M and M' represent salt-forming elements such as the alkali metals or ammonium. This reaction, carried out in water solution, occurs quickly, with the evolution of considerable heat, and the resulting products may be further treated as shown in the typical preparations described below.

Example 1

15 grams diethyl amine were mixed with 15 grams potassium hydroxide and 100 c. c. water, and the resulting mixture treated with 15 grams carbon bisulfide, with shaking and cooling, whereby a solution of potassium diethyl-dithio-carbamate was obtained. To this solution a second solution of 100 c. c. containing 20 grams mono-chloracetic acid and sufficient ammonium hydroxide to neutralize the acid, was added.

In a few minutes the mixture became hot, and was cooled by placing the flask in cold water. The reaction mixture was allowed to stand at room temperature for about 2 hours, was then filtered and hydrochloric acid solution was added to the clear filtrate. A heavy oil was precipitated which, in a few minutes, crystallized. The product, consisting of white crystals, was filtered off, washed with cold water and dried. The product had a melting point of 88° C. The yield obtained was 41 grams.

This material,

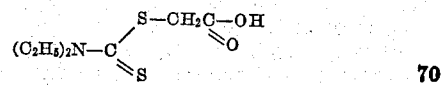

diethyl-dithio-carbamic acetic acid, is not a low temperature accelerator. When compounded in the formula, Smoked sheets_____ 100
Sulfur _____ 5
Zinc oxide_____ 5
Accelerator_____ 1 and vulcanized at a temperature of 288° F., it showed the following physical properties.

| Cure | Tensile | Percent elongation | Load at 500 percent elongation |
|---|---|---|---|
| 30' | 2200 | 800 | 350 |
| 45' | 2730 | 790 | 450 |
| 60' | 3000 | 780 | 580 |

Example 2

50 g. potassiumethylxanthate were dissolved in 100 c.c. cold water and filtered. To this solution was added a second solution consisting of 35 g. chloracetic acid, neutralized with ammonium hydroxide, in 100 c.c. water. The mixture was treated as described in Example 1. In this case when the hydrochloric acid was added, a yellow oil was precipitated, which, after shaking two or three times with fresh portions of cold water, crystallized. A yield of 31 g. dry, white crystals was obtained, which had a melting point of 58° C.

This substance

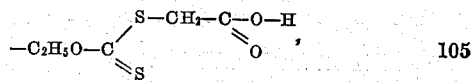

ethyl xanthic acetic acid, was found to have little accelerating value unless used in conjunction with amines. Accordingly the diethylamine salt was formed by ading 7.5 g. diethylamine to 18 g. of the crystalline acid. Heat was evolved, and the mass melted down to a yellow oil, which, on cooling, set to a pasty mass of crystals. When added to the same test compound in the same proportions as shown under Example 1, and cured at a temperature of 258° F., the following results were obtained:

| Cure | Tensile | Percent elongation | Load at 500 percent |
|---|---|---|---|
| 30' | 2880 | 770 | 515 |
| 45' | 3910 | 780 | 720 |
| 60' | 4100 | 770 | 780 |

This accelerator, therefore, is shown to belong to the so called "semi-ultra" class.

Example 3

800 grams ammonium dithiofuroate which contained about 10–15% water insoluble impurities, were dissolved in 2800 c.c. cold water and filtered. To this was added a second solution prepared by mixing 444 grams chloracetic acid, 600 g. cracked ice and sufficient concentrated ammonium hydroxide solution to make the mixture slightly basic. In a few minutes the reaction mixture became warm, and crystals began to appear. In 15–20 minutes the mixture had set to a solid mass of fine, needle-shaped crystals. The crystal mass was broken up and stirred, and allowed to stand over night at room temperature. The crystals were then filtered off, washed with cold water and dried. A yield of 655 g. of fine yellow crystals was obtained. This product was the ammonium salt of dithiofuroic acetic acid,

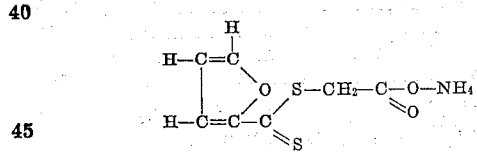

This salt was dissolved in hot water, filtered and the filtrate treated with dilute hydrochloric acid. The free organic acid was at once precipated as a fine orange-red powder, which was filtered, washed with cold water and dried. A yield of 585 g. of the free acid was obtained, which, when dried, had a melting point of 130° C.

This acid and its salts, both of metals, ammonia and organic bases have been found to be very powerful accelerators, and while they may still be classed as ultra accelerators, yet the initial rate of cure of compounds containing them is sufficiently retarded that they may be safely handled without premature vulcanization. To illustrate retarded rate of cure, two compounds were prepared. (A) accelerated with the lead salt of dithiofuroic acid and (B) with the lead salt of the new dithiofuroic acetic acid.

| A | | B | |
|---|---|---|---|
| Smoked sheet | 100 | | 100 |
| Sulfur | 5 | | 5 |
| Zinc oxide | 5 | | 5 |
| Lead salt dithiofuroic acid | .3 | Lead salt dithiofuroic acetic acid | .6 |
| Cottonseed oil | .5 | | .5 |
| Stearic acid | 1. | | 1. |

These compounds were cured simultaneously in a steam heated press at 239° F., with the following results:

Compound A

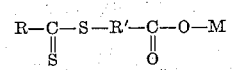

| Cure | Tensile | Percent elongation | Load at 500 percent elongation | Combined percent sulfur |
|---|---|---|---|---|
| 15' | 3800 | 760 | 670 | |
| 30' | 4200 | 750 | 920 | 3.04 |
| 45' | 3800 | 720 | 920 | |
| 60' | 3770 | 730 | 850 | 3.06 |
| 120' | 3540 | 750 | 760 | 3.10 |

Compound B

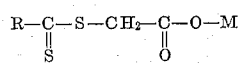

| Cure | Tensile | Percent elongation | Load at 500 percent elongation | Combined percent sulfur |
|---|---|---|---|---|
| 15' | No cure | Stuck in mold | | |
| 30' | 3360 | 800 | 510 | 1.77 |
| 45' | 4100 | 750 | 850 | |
| 60' | 4000 | 740 | 920 | 3.08 |
| 120' | 3750 | 750 | 740 | 3.18 |

It is, of course, possible to replace the ingredients mentioned in the specific examples given above by a wide variety of equivalent materials, such as will be readily suggested to the mind of the organic chemist. Likewise the quantities of materials employed and the procedure of preparation may be widely varied without departing from the scope of this invention. Nor do I intend to limit the use of any member of this new class of accelerators to any particular rubber compound, such as have been given, but include all compounds in which such accelerators may be usefully employed.

By the term alkali metal as set forth in the claims attached hereto as a part of the present specification is meant the alkali metals, lithium, potassium, sodium, caesium and rubidium, together with the NH4 group.

What I claim is:

1. A rubber vulcanization accelerator of the general structure $$R-\underset{\underset{S}{\|}}{C}-S-R'-\underset{\underset{O}{\|}}{C}-O-M$$

where R represents an organic radicle free from carboxylic groups, R' represents a divalent aliphatic radicle and M represents an alkali metal.

2. A rubber vulcanization accelerator of the general structure $$R-\underset{\underset{S}{\|}}{C}-S-CH_2-\underset{\underset{O}{\|}}{C}-O-M$$

where R represents an organic radicle free from carboxylic groups and M represents an alkali metal.

3. A process of preparing a rubber vulcanization accelerator containing the grouping

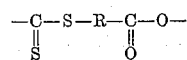

where R is a divalent organic radical, which comprises bringing together in solution an alkali metal salt of a monobasic dithiocarboxylic acid and an alkali metal salt of a halogen substituted aliphatic acid.

4. A process of preparing a rubber vulcanization accelerator containing the grouping

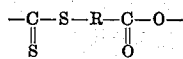

where R is a divalent organic radical, which comprises bringing together in solution an alkali metal salt of a monobasic dithiocarboxylic acid and an alkali metal salt of monochloroacetic acid.

5. A process of preparing dithiofuroic acetic acid which consists in bringing together in water solution an alkali metal salt of dithiofuroic acid and an alkali metal salt of monochloracetic acid, and thereafter treating the solution of the reaction product with a highly ionized acid.

6. A process of preparing the ammonium salt of dithiofuroic acetic acid which consists in bringing together solutions of ammonium dithiofuroate and ammonium chloracetate.

7. A process of preparing a rubber vulcanization accelerator containing the group

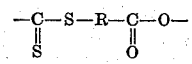

where R represents a divalent radical, which comprises bringing together under reacting conditions an alkali metal salt of a mono basic dithio acid and an alkali metal salt of a halogen substituted aliphatic acid.

8. A process of preparing a rubber vulcanization accelerator containing the group

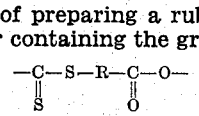

where R represents a divalent radical, which comprises bringing together under reacting conditions an alkali metal salt of a mono basic dithio acid and an alkali metal salt of a chlor substituted aliphatic acid.

9. A process of preparing a rubber vulcanization accelerator containing the group

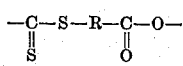

where R represents a divalent radical which comprises bringing together under reacting conditions an alkali metal salt of a monobasic dithio acid and an alkali metal salt of a mono chlor substituted aliphatic acid.

10. A process of preparing a rubber vulcanization accelerator containing the group

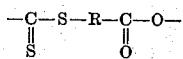

where R represents a divalent radical which comprises bringing together under reacting conditions an alkali metal salt of a monobasic dithio acid and the ammonium salt of mono chlor acetic acid.

11. A vulcanization accelerator of the general structure

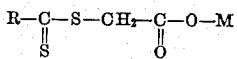

where R represents an organic radical free from carboxylic groups and M represents an alkali metal or hydrogen.

12. A rubber vulcanization accelerator of the structural formula

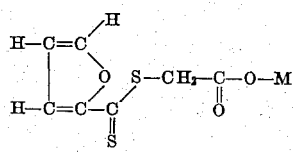

where M represents an alkali metal or hydrogen.

ALBERT F. HARDMAN.